March 3, 1931.  A. KNUTSON  1,794,964
COMPASS CARD AND BEARING BOARD
Filed Feb. 4, 1929
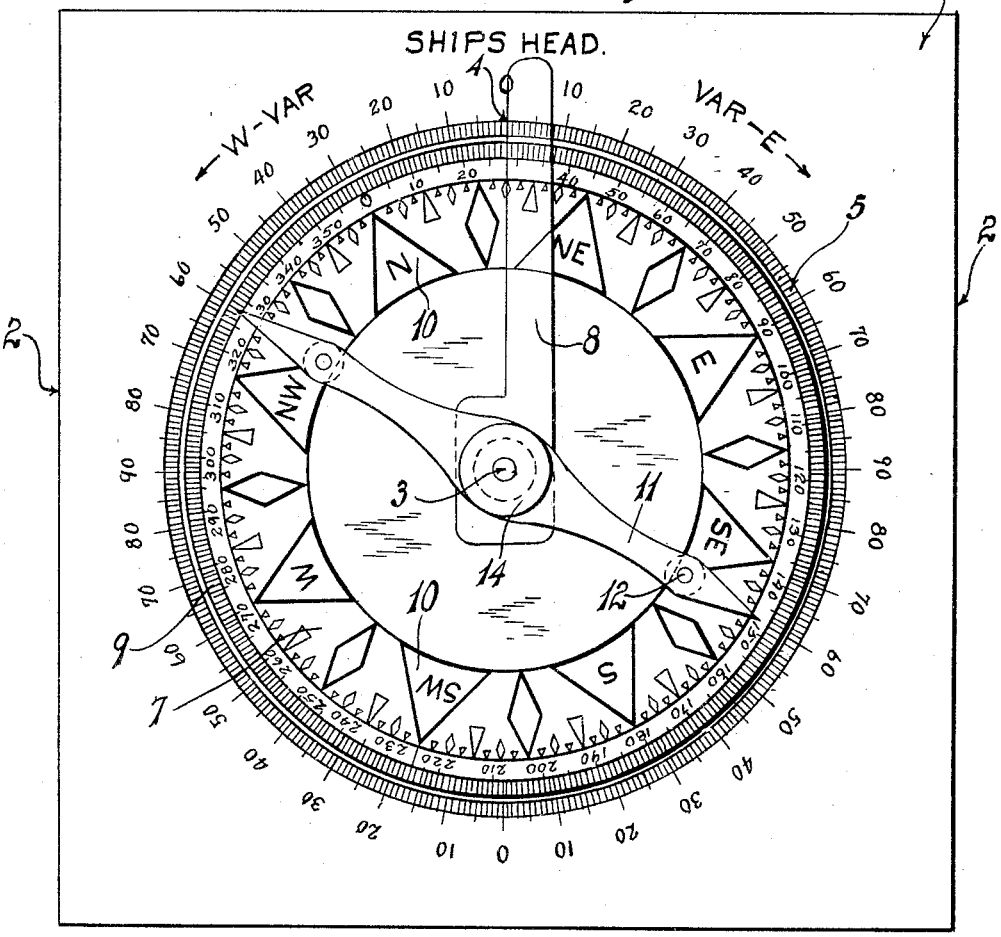
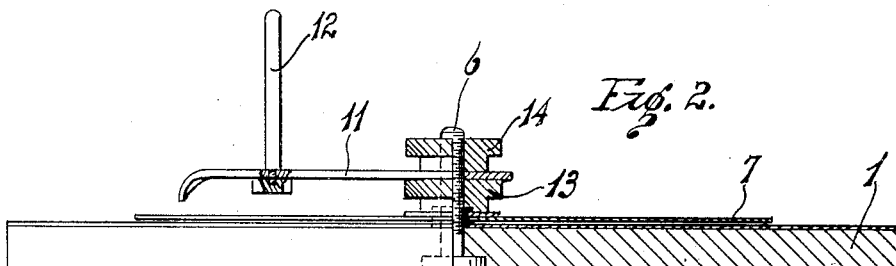
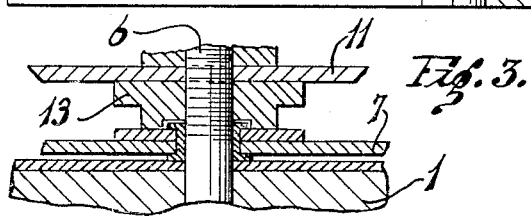
INVENTOR
ALFRED KNUTSON.
ATTORNEY.

Patented Mar. 3, 1931

1,794,964

UNITED STATES PATENT OFFICE

ALFRED KNUTSON, OF SAN PEDRO, CALIFORNIA

COMPASS CARD AND BEARING BOARD

Application filed February 4, 1929. Serial No. 337,231.

This invention relates to a compass card and bearing board by means of which the position of a ship can be determined from known stationary points, or the true course can be determined from the magnetic course.

An object of my invention is to provide a compass card and bearing board which is simple in construction and is easily operated.

Another object is to provide a device of the character stated by means of which the mariner is able to accurately compute the correct position of the ship without an extensive knowledge of mathematics or navigation.

A further object is to provide a device which is inexpensive to manufacture.

Other objects, advantages, and features of invention may appear from the accompanying drawing, the subjoined detailed description, and the appended claims.

In the drawing:

Figure 1 is a plan view of my invention.

Figure 2 is a side elevation, partly in section, of the same.

Figure 3 is an enlarged fragmentary sectional view of the disc and arrow mounting and fastening means.

Referring more particularly to the drawing, the numeral 1 indicates a board which is preferably square and the sides 2 thereof are parallel to a line drawn through the center 3 and a point marked zero (ship's head), shown at 4. A circular protractor 5 is imprinted on the surface of the board 1, the center thereof being the point 3. This protractor is calibrated in four equal quarters. A threaded pin 6 is mounted in the board 1 at the center point 3 and a disc 7 is rotatably mounted about the pin 6 and over the protractor 5. The outer diameter of the disc 7 is less than the diameter of the protractor 5 so that the calibrations on both the protractor and disc can be simultaneously seen. This will be evident from Figure 1.

An alining finger 8 which is preferably formed of a transparent material is also pivoted about the pin 6 for the purpose of accurately alining the protractor and the disc. The disc 7 is calibrated around its periphery in degrees which are consecutively numbered from zero to 360 degrees. This calibration is illustrated at 9. The disc 7 is also provided with a calibration in points and quarter-points, as at 10, the purpose of which will be further described.

A double-ended arrow 11 is rotatably mounted on the pin 6 above the disc 7 and this arrow is provided with a pair of alining pins 12, 12, which pins may be removed from the arrow when desired. A knurled nut 13 screws onto the pin 6 against the finger 8 and disc 7 to hold these members against movement, and a second knurled nut 14 screws onto the pin 6 for the purpose of holding the arrow 11 against accidental movement.

The operation of my compass card and bearing board is as follows: One of the edges 2, 2 is placed against a surface which is parallel to the keel of the vessel. The side of the board designated "Ship's head", in Figure 1, is pointed towards the prow of the boat. Now if it is desired to compute the position of the ship by computations from the magnetic compass this will be accomplished in the following manner.

Assuming, for example, that the reading on the magnetic compass is 50 degrees, by examining the declination and variation tables which are always provided in the ship it is found that the variation east would be 10 degrees for that particular position of the compass. Now for an easterly variation it is necessary to add the amount of that variation, therefore, 50 plus 10 is 60, and the disc 7 is set at 60 degrees, the 60 appearing opposite the zero mark on the protractor. Again by consulting the tables the deviation on the ship's head, which is apparent ship's course, is 2 degrees west. By known rules it is necessary that a west deviation must be subtracted. Subtracting 2 from 60, we arrive at the final result of 58 degrees. The disc 7 is then clamped at 58 degrees which represents the true course of the vessel.

To compute the ship's position from a known point on land the long point of the arrow 11 is pointed towards the object and is lined accurately therewith by means of the pins 12, 12 at the same instant that the ship is held accurately in its compass course. The disc 7 is moved so that the zero thereon is alined with the zero on the protractor. When the ship has been brought into its course and the arrow alined as previously stated, the reading of the long point of the arrow on the disc is taken. This reading is in degrees. This angle is drawn on the chart from the known point on land. A second object is taken on another known point in the same manner as previously stated and a line is again drawn from the second point. The intersection of these two lines is the position of the ship.

If it is not possible to take an observation upon two different points on land the ship's position can be computed from one known object by various rules of navigation, all of which are usual and well-known.

If a magnetic bearing is desired the magnetic course in degrees is set on the disc 10 opposite the zero point on the protractor and the disc is then clamped in this position by the nut 13. The short end of the arrow is then swung towards a known object and a reading is taken on the calibrations 10 in points and quarter-points. The magnetic bearing thus obtained is then plotted on the chart in the same manner as stated above when the true course of the vessel was found.

Now if it is desired to change a true course to a compass course the true course is plotted on the chart and we will suppose this direction is 310 degrees from the port that the vessel left. From the chart or the table, the variation is found to be 5 degrees east. This variation is subtracted from the previous reading 310, giving 305 degrees. From the compass deviation card, it is determined that the deviation is 2 degrees west. This deviation is added to the 305, giving a final corrected reading of 307 degrees which is the compass course.

My board may also be used to determine the compass deviation by determining the difference between the magnetic bearing and the compass reading.

The use of my compass card and bearing board will to a large extent eliminate error in computing a ship's position or course and will materially simplify these computations. The navigator also will be able to determine his position frequently in a minimum length of time and with accuracy.

Having described my invention, I claim:

1. A compass card and bearing board comprising a rectangular board, a pin positioned in the center of said board, a protractor imprinted on the board with said pin as a center, said protractor being so arranged that the line through the zero point of the protractor and the pin shall be parallel to the sides of the board, said protractor being calibrated in four quarters of 90 degrees each, a disc rotatably mounted on said pin, the periphery of said disc being calibrated in 360 degrees, an arrow rotatably mounted on said pin, means to clamp said disc against accidental movement, and means to clamp said arrow against accidental movement.

2. A compass card and bearing board comprising a rectangular board, a pin positioned in the center of said board, a protractor imprinted on the board with said pin as a center, said protractor being so arranged that the line through the zero point of the protractor and the pin shall be parallel to the sides of the board, said protractor being calibrated in four quarters of 90 degrees each, a disc rotatably mounted on said pin, the periphery of said disc being calibrated in 360 degrees, an arrow rotatably mounted on said pin, means to clamp said disc against accidental movement, and means to clamp said arrow against accidental movement, alining pins removably mounted in said arrow, one pin being positioned at either end of said arrow, and an alignment finger rotatably mounted over said disc on the pin.

3. A compass card and bearing board comprising a rectangular board, a pin positioned in the center of said board, a protractor imprinted on the board with said pin as a center, said protractor being so arranged that the line through the zero point of the protractor and the pin shall be parallel to the sides of the board, said protractor being calibrated in four quarters of 90 degrees each, a disc rotatably mounted on said pin, the periphery of said disc being calibrated in 360 degrees, a nut screwed on said pin against the disc, an arrow rotatably mounted on said pin above the nut, a second nut screwed on the pin against the arrow, and an alining pin at either end of said arrow.

4. A compass card and bearing board comprising a rectangular board, a pin positioned in the center of said board, a protractor imprinted on the board with said pin as a center, said protractor being so arranged that the line through the zero point of the protractor and the pin shall be parallel to the sides of the board, a disc rotatably mounted on said pin, the periphery of said disc being calibrated in 360 degrees, a nut screwed on said pin against the disc, an arrow rotatably mounted on said pin above the nut, a second nut screwed on the pin against the arrow, and an alining pin at either end of said arrow, an alining finger rotatably mounted on said pin over the disc, and a second calibration on the disc in points and quarter-points.

In testimony whereof, I affix my signature.

ALFRED KNUTSON.